Patented Jan. 1, 1952

2,580,808

UNITED STATES PATENT OFFICE 2,580,808

PROCEDURE FOR DISINFECTING AQUEOUS LIQUIDS WITH BROMINE

Henry C. Marks, Glen Ridge, and Frede B. Strandskov, Belleville, N. J., assignors to Wallace & Tiernan Products, Inc., Belleville, N. J., a corporation of New Jersey No Drawing. Application January 29, 1948, Serial No. 5,213

11 Claims. (Cl. 210—23)

In procedures for disinfecting aqueous liquids objection has sometimes been found to the ordinary sort of chlorine treatment, i. e. the introduction of chlorine in elemental or hypochlorous form. More specifically, disadvantages have arisen in the case of swimming pools, in the purification of industrial process water and in like situations where other materials present in the water tend to delay or impair the activity of the sterilizing agent. For instance, in swimming pools small quantities of ammonia are almost invariably present, and react with the chlorine to form chloramines, which are so slow in sterilizing effect that one swimmer may infect another near him before the contaminating organisms can be killed by the chloramine content of the water. If larger proportions of chlorine are applied, with the view of developing a residual of free chlorine above that consumed, so to speak, in combination with the ammonia, the so-called breakpoint reaction is apt to occur, producing nitrogen trichloride which is irritating to the eyes and has a bad odor. If the chlorine concentration is kept low, to avoid nitrogen trichloride formation, the bactericidal activity remains markedly decreased by the ammonium compounds, which react in the manner explained to convert the free chlorine to the much less powerful form of chloramine; and furthermore, experience indicates that the more ammonia present, the greater is the decrease in bactericidal efficiency.

It has been proposed, particularly for recirculated systems or small water supplies or the like where somewhat increased cost is not an important factor, that bromine be used for disinfecting purposes; the sterilizing efficiency of free bromine or of hypobromous acid (HOBr) which may be formed by hydrolysis, is approximately the same as that of free chlorine or hypochlorous acid, on a stoichiometric basis. It has been found, however, that the activity of bromine is also materially decreased by the presence, as in swimming pool water, of the small quantities of ammonia (e. g. in the form of ammonium compounds) which are sufficient to form bromamines. Although the effect is by no means so severe in the case of bromine—i. e. in that bromamine appears to be a desirably active agent for some purposes, as in instances when it is supplemented with the presence of free bromine—the complete conversion of bromine to bromamine represents a definite impairment of bactericidal efficiency for those situations where a rapidly available sterilizing agent is desired. In speed of reaction with organic contamination, e. g. bacteria, bromamines thus occupy an intermediate position between the very slow effect of chloramines and the rapid activity of free chlorine and free bromine. Furthermore in the presence of the amounts of ammonia which are commonly found in swimming pools and which react to form bromamines, bromine solutions tend to become quite unstable and to lose active bromine rapidly. Consequently in pool water and other situations where the sterilizing action should be extremely prompt and yet should be continuously available at all times, the simple treatment of feeding elemental bromine in theoretically sufficient amounts, is very apt to fall short of the desired results.

The present invention, designed to overcome these difficulties and to provide an effective procedure for disinfecting aqueous liquids, is grounded on the very unexpected discovery that by treating the liquid with bromine in relatively small quantities corresponding to those theoretically sufficient when it is present wholly in the free form, and by additionally supplying ammonia to the liquid in a theoretically great excess, e. g. in a relatively large amount so as to maintain a very high excess over that which would combine with all of the bromine to form bromamines, the result is a bactericidal activity of a remarkably prompt and stable nature. The disinfecting power is distinctly superior to that afforded with bromine alone under the adverse circumstances discussed above, and in fact may be practically equal to that which is exhibited by free bromine in the complete absence of ammonia. In some unusual way, as yet unexplained, the large excess ammonium concentration appears to restore the sterilizing efficiency of bromine, and appears to do so without any corresponding disadvantage—e. g. in that maintenance of the ammonia excess can be achieved without adverse effect on the taste, odor, or other qualities of the water, or on its physiological inertness to persons using it for swimming, drinking or other purposes.

It has also now been found that these remarkable results are produced not only when the bromine is supplied as such to the water (where it may then be converted to bromamines), but also when it is actually added in a combined yet available form such as bromamine, or one of the organic N-bromo compounds of which examples are bromomelamine, bromosuccinimide, and p-toluene-sulfonbromamide. Although compounds of this type contain bromine in an active or available form, i. e. having oxidizing properties appropriate for killing various organisms, the bactericidal activity is generally less than that of free bromine, and indeed is so much less in the case of the organic N-bromo compounds that alone and under ordinary circumstances the latter would never even be considered for use as sterilizing agents in swimming pools. On the other hand, whereas elemental bromine is a corrosive liquid, somewhat difficult to handle and requiring some care for its proper introduction in the treatment of water, many of the N-bromo compounds—such term being used herein and in the appended claims to mean organic N-bromo compounds—are readily handled substances, i. e. in that they do not have the highly corrosive and toxic properties of liquid elemental bromine and can be easily made up into solutions for injection in flowing water without any special precautions. Indeed the various N-bromo compounds named above by way of example, are relatively stable, crystalline solids that can be handled with no more difficulty than common salt. Accordingly the present invention, affording procedure whereby compounds of this character may be employed for disinfecting aqueous liquids with a sterilizing efficiency equivalent to that of free bromine, is of very great advantage in practical operations.

For convenience of identification the terms "available" and "active" are used herein to describe bromine in any of its forms commonly considered available in a broad sense, e. g. not only free bromine but also bromamines and N-bromo compounds of the character mentioned above. It will be understood that "free" bromine refers to bromine in its elemental form or more usually in the form of hypobromous acid as produced by hydrolysis or otherwise. Although the precise chemical form assumed by the bromine by reason of the present process involving establishment of a large excess of ammonia has not been ascertained, the enhanced sterilizing efficiency may be conveniently expressed by describing the bromine as in a rapidly available form, i. e. meaning more promptly active, or with an activity substantially faster than that of bromamines.

According to a presently preferred manner of carrying out the improved process, for instance in a swimming pool, available bromine is introduced into the recirculating stream of water, in appropriate amounts, e. g. to maintain the desired bromine residual in the pool water. Swimming pools commonly provide for the continuous withdrawal of such a stream of water, to be passed through purifying apparatus (heretofore usually a chlorine feeding device) and then returned to the pool. Thus the bromine can be introduced continuously, at the necessary rate, into the withdrawn stream, or in some cases, by rapidly intermittent feed of separate amounts. At the outset of operations ammonia is also applied to the pool water, either by feeding it into the re-circulating stream or indeed directly into the main body of the pool, in the desired amount as more specifically explained below. Ordinarily there is no necessity for continuous or otherwise frequent introduction of additional ammonia, since it does not appear to be consumed by reaction in the course of the process or of the more or less continuous sterilizing action against the successive contaminations which are being introduced, at least at frequent intervals, by the use of the pool and throughout the period of such use.

From time to time, say once a day, additional water is added to the pool to make up for losses by evaporation or otherwise, or indeed some portion of the water may be drawn off and replaced simply to reduce the content of dissolved though relatively harmless substances in the pool water. On such occasions further quantities of ammonia should be added, the paramount requirement for both bromine and the ammonia being to maintain the desired bromine residual and the preferred ammonia concentration at all times. As will be apparent from the foregoing the bromine can be introduced either as elemental bromine, i. e. by making a solution of the latter and feeding it into the re-circulating stream, or quite preferably in many cases, as an N-bromo compound, which is easily dissolved in water for the desired feeding operation.

It seems to be of no presently ascertained consequence whether the ammonia is introduced before, as or after a concentration of residual bromine is first established in the pool; so long as both steps are in fact performed, the improved sterilizing action is obtained, and thus unless otherwise specified, recitals of the method herein are not intended to be limited to any particular order of the steps. Very conveniently the ammonia may be employed in the form of a gas, which is dissolved readily in water, e. g. in the re-circulating stream or in a separate quantity of water to be supplied to the latter or to the pool proper. In lieu of gaseous ammonia or ammonium hydroxide, other ammonium compounds may be employed, viz. such as release ammonium ions in water solution, examples being ammonium alum, ammonium chloride and other ammonium salts.

References herein to the supply or presence of "ammonia" are intended, unless otherwise further limited, to mean the supply or presence of ammonia nitrogen, whether as ammonia or in ammonium or ammonia-type compounds.

Operation in the case of other re-circulated systems, such as industrial process water, cooling water employed in various manufacturing operations, and the like, can advantageously be performed in the manner just described for swimming pools. Where the process is applied to aqueous liquid flowing in a continuous stream or otherwise requiring treatment only once, it will now be appreciated that to establish the desired concentrations of both available bromine and excess ammonia in the flowing liquid, each of the reagents should be fed continuously, or by increments in suitably rapid succession.

The improved procedure of the invention is thus applicable to many other situations than swimming pools, i. e. not only where small amounts of ammonia may be present in the water or other aqueous liquid in an analogous and unavoidable manner, but also where there may be other difficulty in the use of chlorine or of elemental bromine alone. For instance, organic material, e. g. of a nitrogen-containing character, may be present in such form and amount as to decrease materially the activity of bromine when the latter is introduced in its free form. Moreover, the particularly advantageous method involving the use of N-bromo compounds, as described above, is of special utility where elemental bromine is objectionable because of difficulty in handling and feeding it and where chlorine may likewise be objectionable, either for the same reason or because of other conditions tending to impair its utility—chlorine, for instance, being more readily converted to relatively inactive hypochlorite ions than bromine to hypobromite ions.

The peculiar efficacy of the present method in providing the effect of rapidly available bromine has been quantitatively demonstrated. One such set of tests involved inoculation of water samples with representative organisms under various circumstances, and determining the time necessary to produce an effective destruction of the organisms. It may be explained that for bacteriological appraisal, tests of this sort are believed to be more significant than mere examination of samples taken from a swimming pool in actual use. In the first place, the normal operation of swimming pools involves many uncontrollable variables that jointly militate against true interpretation of analyses so made. Furthermore, water samples taken at random from a well operated pool seldom contain organisms of sanitary significance, e. g. bacteria dangerous to health. This condition occurs even under prior types of operation (i. e. with chlorine in the form of chloramines), but the absence of pathogenic organisms in the removed water is by no means significant of the absolute safety of the pool. As indicated hereinabove, a principal danger of infection is that organisms introduced by one swimmer may reach another a minute or two later and infect him before a slow sterilizing agent such as chloramine can act; yet by the time a test sample of water is taken and examined, there has usually been a long enough contact time to destroy the bacteria.

Accordingly in one set of tests a series of water samples at pH 7 and 25° C. were inoculated with like, predetermined, heavy concentrations of spores of *Bacillus metiens*. Thereupon each sample was treated with bromine, in the form of a water solution sufficient to provide 23 P. P. M. (parts per million) of available bromine in the sample, and the several samples were also at the same time supplied with different amounts of ammonia, in the form of ammonium hydroxide. At successive short intervals portions of the samples were withdrawn, de-brominated with sulfite, i. e. to eliminate the available bromine, and then examined bacteriologically to determine the percentage (if any) of the organisms that had been killed. This procedure was continued with each sample until a time was reached when the currently withdrawn portion revealed 99% kill, representing a significant end point. The following table summarizes the results with respect to various quantities of ammonia, measured as the nitrogen thereof, in parts per million.

Table I

| Ammonia Nitrogen (P. P. M.) | Moles NH₃ per mole Br₂ | Time for 99% Kill (minutes) |
|---|---|---|
| 0 | | 11 |
| 2.5 | 1.24 | 108 |
| 100.0 | 49.6 | 16.6 |

In another set of tests a similar procedure was followed, except that the effect of the presence of peptone was specifically studied, peptone being a nitrogen-containing organic material corresponding to impurities often found in swimming pools and other waters that require sterilizing treatment. So present, peptone is itself physiologically harmless but has been found to affect the activity of bromine adversely. Thus except that each water sample after the first contained a small quantity of peptone (measured by its nitrogen content) and except that the available bromine concentration (Br₂) was 25 P. P. M. in each sample, the tests were performed exactly as those summarized in Table I, with the same test organisms, viz. spores of *B. metiens*. The results were as follows:

Table II

| Ammonia Nitrogen (P. P. M.) | Peptone Nitrogen (P. P. M.) | Time for 99% Kill (minutes) |
|---|---|---|
| 0 | 0 | 10 |
| 0 | 2 | 48 |
| 100 | 2 | 10 |

In these tests, as well as in others described below, the spores of the stated organisms were used so that easily measurable concentrations of bromine and easily measurable time intervals might be employed, and thus greater accuracy of results obtained than by employing another form of the organism and much smaller concentrations of bromine. In the light of wide experience in determining sterilization efficiencies in water under various other circumstances, it seems certain that the results of these tests are fully indicative of the results obtained, but difficult to measure, in actual practice using bromine concentrations of the order of 1 P. P. M.

As shown in Table I, a very sharp decrease in activity was caused by the presence of about 1 mole of ammonia for 1 mole of bromine; but upon increasing the molar ratio of ammonia to bromine to about 50, the killing time is almost as short as when no ammonia is present at all. Like results are revealed by Table II, indeed indicating that the presence of the excess ammonia is even more advantageous when organic nitrogen such as peptone is present. In interpreting these and other data herein, it will be understood that considering 1 part by weight of available bromine as 1 mole of Br₂, 1 part by weight of ammonia (measured as nitrogen) is approximately equivalent to 11 moles of ammonia, i. e. 11 times the stoichiometric quantity of ammonia necessary to combine with the 1 part of bromine to form bromamine.

It has also been found that as compared with the properties of available bromine in the presence of relatively small or moderate concentrations of ammonia, the chemical activity of bromine is very considerably greater when a large excess of ammonia is present. One effective demonstration of this effect is in the phenomena observed when bromine solutions with varying contents of ammonia are subjected to amperometric titration of the active bromine, using the titration method described by Marks and Glass in the Journal of the American Water Works Association, vol. 34, page 1227, August 1942. Although free bromine can be titrated very easily and quickly by this method even in concentrations of 1 P.P.M., the addition of sufficient ammonia to form bromamines slows down either the electro-chemical reaction of the bromine or the reaction with sodium arsenite (which the cited test requires) or both so that the titration then requires a tremendously long, in fact apparently an infinite time, to carry out, on the other hand, in the presence of a large excess of ammonia the speed of these reactions is relatively normal, i. e. of the same order as in the case of free bromine without any ammonia present at all, so that the titration can be completed in about the usual time.

This titration procedure includes supplying successive, small, measured quantities of a standard sodium arsenite solution to the bromine solution under test, while noting the corresponding decreases in current flow through the cell wherein the bromine solution constitutes a significant part of the electrical path. The end point of titration is the total amount of arsenite (introduced by successive increments) beyond which further addition of such reducing agent causes no change in current flow. With free bromine, the change of current is prompt upon each addition of arsenite, but with bromamines it is found to be extremely slow, in fact so slow as to prevent the attainment of the desired titration. More specifically, one set of such tests involved a series of bromine solutions, each containing 1 P.P.M. available bromine at pH 7 and 25° C., and containing varying quantities of ammonia.

The results are summarized as follows:

Table III

| Ammonia Nitrogen (P. P. M.) | Moles $NH_3$ per Mole $Br_2$ | Titration Reaction |
| --- | --- | --- |
| 0 | 0 | Fast: normal titration. |
| 0.2 | 2.28 | Very slow: titration impossible. |
| 0.5 | 5.7 | Do. |
| 50.0 | 570 | Slower than normal: titration possible but slow. |
| 100.0 | 1140 | Fast: normal titration. |

Thus in the presence of a great excess of ammonia the titration reaction returned to normal; and although in these electro-chemical tests somewhat larger proportions of ammonia seemed necessary (to reach a state of equivalence with free bromine) than is needed for restoration of the bactericidal activity, the chemical results are clear confirmation of the novel principles of the process as practiced to attain the improved bactericidal effects.

It has also been found that the acceleration of bromine activity with large increase of ammonia concentration is accompanied by a desirable increase in the stability of the bromine solution with regard to spontaneous decomposition. That is to say, in the presence of the small amounts of ammonia that are necessary to form bromamines and that are likely to be present in swimming pools and other circumstances of actual use, bromine solutions (e. g. of the order of 1 P.P.M.) become quite unstable and lose active bromine rapidly. When a large excess of ammonia is supplied, the stability, like the bactericidal activity, is restored to approximately that of free bromine. All of these effects, including the restoration of bactericidal activity, chemical activity and stability, have been observed over a wide range of pH and temperatures, the specific tests at pH 7 and 25° C. being reported simply as representative.

According to present experience with the process, it appears that in general, for a given concentration of available bromine, ammonia should be supplied in a quantity providing at least about 100 times the stoichiometric amount relative to the bromine, in order to restore the activity completely, i. e. to provide the same rapidity of reaction as is characteristic of free bromine alone. In some cases further increase of the ammonia concentration, e. g. up to 1000 times the stoichiometric amount, may be desirable or necessary to achieve maximum activity. On the other hand, ammonia concentrations of from 50 to 100 times the stoichiometric quantity are approximately as effective for most practical purposes, are quite economical and are at present preferred for swimming pool and other water treatment with the process. Generally speaking, some useful improvement over the slow activity of bromamines is obtainable with an ammonia content as low as about 10 times the stoichiometric value (i. e. about 1 P.P.M. $NH_3$ where the $Br_2$ residual is 1 P. P. M.), although not usually with any less amount where the bromine is applied in elemental form (meaning also the hypobromous form); but a more advantageous minimum for attainment of rapidly available bromine is to keep the ammonia at a concentration of at least 20 times the chemical equivalent of the bromine residual.

By way of specific example, reference is made to the treatment of swimming pool water which may contain from 0.1 to 0.5 P. P. M. ammonia (measured as ammonia nitrogen). Bromine is supplied regularly, e. g. by continuous feed to the re-circulating stream at a dosage which provides, say, a residual content of available bromine of about 1 P. P. M. after reaction with reducing agents in the water. Under these circumstances alone, the bromine is likely to be all converted to bromamine, with the disadvantages noted above. However, in accordance with the present process, a relatively considerable quantity of ammonia is added at the outset of operations, for instance in the form of a water solution of the gas and in sufficient amount to provide from about 8 to 10 P. P. M. ammonia throughout the pool. It will be appreciated, of course, that the unpredictable amounts of ammonia introduced in the water by swimmers cannot be counted on as any great part of the total concentration to be maintained, even where it may be deemed adequate to use a smaller bromine residual than 1 P. P. M.; for positive assurance of safety in a matter of health, the initial supply should be fully sufficient to provide the desired excess ammonia content.

As the pool continues in use, bromine feed is continued, essentially as in the prior practice for treatment with chlorine or bromine alone, and to the extent that water of the pool is replaced or at any time when the ammonia content is found to have decreased, as for some unusual reason, further ammonia is added from time to time, i. e. to maintain the desired large excess. With the process so carried out, remarkably prompt sterilizing action is obtained, the bromine being quite stable and in effect rapidly available in a manner comparable to the free halogen with no ammonia present at all.

Reference has been made hereinabove to the maintenance of a residual bromine concentration of about 1 P. P. M., a value usually effective and yet economical for swimming pools, drinking water, process water and the like. In general, and notably in water that encounters any personal use, a suitable range for the available bromine is from about 0.3 to 2 P. P. M.—a concentration of at least about 1 P. P. M. being ordinarily preferred. It will be understood that the process of the invention may be usefully employed with higher concentrations (than 2 P. P. M.) of bromine, for instance up to 100 P. P. M., providing the circumstances of use are such that a halogen concentration of that magnitude would be permissible; indeed under appropriate conditions (for instance where it is desired to use an N-bromo compound, but with a rapid oxidizing effect) the process can be expected to have utility even at very high values of bromine content. In all such cases, the ammonia concentration should be maintained at a proportionally large enough value to afford the desired high excess in a stoichiometric sense.

In most cases the upper limit of ammonia concentration is chiefly a matter of convenience and economy, depending on the circumstances of use of the aqueous liquid under treatment. Ammonia concentrations of the order of 8 to 10 P. P. M. are far below any value which might be objectionable from the standpoint of taste, odor or physiological irritation, and in fact concentrations up to 100 P. P. M. or so may be employed, if economically advantageous, without serious objection in any of these respects. In industrial process water or the like, a governing factor is the extent to which chemical modification of the water can be tolerated; but even 200 P. P. M. ammonia is a small quantity in comparison with the strengths of reagent solution encountered in many ordinary chemical operations.

By way of demonstration of the peculiarly advantageous procedure whereby rapidly available bromine is attained with N-bromo compounds which are inherently very slow in bactericidal effect, extensive biological tests have been made with representative examples of such substances. For instance in one set of tests p-toluenesulfonbromamide was employed as the source of available bromine, it being understood that in all these compounds the bromine is combined in a theoretically active or available form, and not as a bromide or the like. In all other respects, the test procedure was precisely like that of the tests summarized in Table I above, with the minor exception that the amount of the N-bromo compound was sufficient in each water sample to provide an available bromine concentration of 25 P. P. M. The test organism consisted of spores of B. metiens, employed for the same reasons as in the preceding tests, and with the same effect of accurately representing results obtainable under a wide variety of other circumstances. The results showing the effect of ammonia concentration on the activity of the stated compound, p-toluenesulfonbromamide, are summarized in the following table:

Table IV

| Ammonia Nitrogen (P. P. M.) | Moles NH₃ per Mole Br₂ | Time for 99% Kill (minutes) |
|---|---|---|
| 0 | 0 | 110 |
| 1.0 | 0.46 | 44 |
| 2.0 | 0.91 | 36 |
| 10.0 | 4.6 | 25 |
| 100 | 45.7 | 14 |
| 1,000 | 457 | 9.5 |
| 10,000 | 4,570 | 8.5 |
| 0 | ¹0 | 9.4 |

¹ Free bromine used.

The last row of figures represents a comparison test made (in the absence of ammonia) with 25 P. P. M. free bromine instead of the N-bromo compound, and it will be at once noted that whereas the N-bromo compound, by itself and in the absence of further combined nitrogen (i. e. ammonia-type nitrogen), was only slowly active, great improvement in activity was obtained by providing increasing concentrations of ammonia, even up to an activity greater or more rapid than that of free bromine itself.

Tests were also made with other N-bromo compounds such as dibromomelamine, bromoethylamine and bromosuccinimide, representing wide differences of chemical structure from the above substance and from each other. A representative set of tests with these substances was performed in the same manner as described above, i. e. using water samples inoculated with spores of the stated organism and then treated with the different bromine compounds in the presence of varying concentrations of ammonia. Each compound was used in a quantity providing 25 P. P. M. available bromine, and the results were as follows:

Table V

| Ammonia Nitrogen (P. P. M.) | Time for 99% Kill (Minutes) | | Bromosuccinimide |
|---|---|---|---|
| | Dibromomelamine | Bromoethylamine | |
| 0 | 150 | 240 | 180 |
| 2 | 70 | | |
| 10 | 27 | 35 | 37 |
| 100 | 14 | 24 | 21 |

Again it will be noted that the presence of a considerable excess of ammonia (over that which is in effect contained in the N-bromo compound itself) afforded marked improvement in the bactericidal activity, to the extent that with 100 P. P. M. ammonia nitrogen, representing an ammonia concentration of the order of 50 times the stoichiometric amount, the bromine became very rapidly available, in a manner comparable to the activity of free bromine. In contrast, each of the compounds concerned in Tables IV and V required, by itself, about 10 to 25 times as long for a kill as did the free bromine.

More specifically, with various N-bromo compounds tested, the addition of 50 to 500 times the stoichiometric amount of ammonia gave the bromine a bactericidal activity equal to that of the free element, and indeed practically optimum results were obtained with 50 to 100 times the stoichiometric quantity. While an ammonia concentration of about 10 or more times the stoichiometric quantity is ordinarily preferred, it will be noted that improvement of at least some utility was had where the added ammonia concentration is no more than 2 to 5 times the stoichiometric amount, or even as low as one such amount. Thus for actual operation the process may comprise supplying an N-bromo compound to provide available bromine, and maintaining in the water a suitable excess of ammonia, which in the special case of these compounds can sometimes have a lower value of concentration while still yielding some useful effect, than in situations where the bromine is supplied in an originally free (i. e. elemental) form. Here and elsewhere, of course, all quantitative references to the ammonia concentration to be supplied or maintained in the water mean only the ammonia in addition to that (or other nitrogen) which may be originally combined with the bromine as in the case of N-bromo compounds, or likewise only the excess beyond that which (being otherwise present in the water) combines to form bromamine in the case where elemental bromine is fed.

Even in cases where free bromine might exhibit its bactericidal activity unimpaired, the present procedure using an N-bromo compound can be of special advantage, because it makes possible the attainment of disinfecting efficiency equal to that of free bromine, while avoiding the handling of the liquid, elemental substance, which is corrosive, toxic and otherwise difficult to use. As a matter of known or readily ascertainable properties, many N-bromo compounds are solids of a stable and easily handled nature, and are thus peculiarly appropriate for the purpose just mentioned; for example, among the substances used in the above tests these properties are characteristic of p-toluenesulfonbromamide, dibromomelamine and bromosuccinimide. Thus in actual practice the selected compound (which is preferably a stable solid) can be easily supplied to the liquid under treatment, for instance by first making up a solution of the compound, the procedural steps being then identical (either for swimming pools or other types of treatment) with those explained hereinabove for the use of elemental bromine, except that instead of the free bromine solution, the solution of the N-bromo compound is fed.

In all aspects, the invention affords a novel and peculiarly effective procedure for disinfecting aqueous liquids, providing prompt sterilization where such is needed and yet cannot be satisfactorily obtained with certain older methods. In swimming pools or like situations where organic contamination, i. e. pathogenic organisms, may be introduced at successive and usually frequent intervals over a long period of time, the process affords prompt removal of such contaminations, for instance with the view of reducing, in swimming pools, the possibility of one person being infected with organisms introduced by another nearby. It will be appreciated that reference to the removal or destruction of contaminating material in aqueous liquids, as by these procedures, includes and indeed usually means the elimination of the contaminating or other objectionable character of such material by chemical reaction, rather than any mechanical separation of the material from the liquid.

It is to be understood that the invention is not limited to the specific embodiments herein described but may be carried out in other ways without departure from its spirit.

We claim:

1. Procedure for treatment of aqueous liquid to remove contaminating material, comprising supplying available bromine to the liquid to provide a residual bromine content of at least about 1 P. P. M. and supplying ammonia thereto to establish an ammonia content of at least about fifty times the stoichiometric quantity relative to the bromine.

2. Procedure for treatment of aqueous liquid to remove contaminating material, comprising supplying available bromine to the liquid to provide therein an available bromine concentration of at least about 0.3 P. P. M. and supplying ammonia thereto in sufficient quantity to establish an ammonia content of at least about ten times the stoichiometric quantity relative to the bromine.

3. The procedure of claim 2 in which the available bromine is supplied in the form of an N-bromo compound which is a stable solid, said compound being introduced as an aqueous solution thereof and in amount to provide an available bromine concentration in the liquid of at least about one P. P. M.

4. The procedure of claim 2 in which the available bromine is supplied by introducing an aqueous solution of elemental bromine, and in which the ammonia is supplied in amount to establish an ammonia content of at least about fifty times the stoichiometric quantity.

5. Procedure for treatment of aqueous liquid to remove contaminating material, comprising supplying available bromine to the liquid to provide therein an available bromine concentration of at least about 0.3 P. P. M. and supplying ammonia thereto in an amount which is equal to at least about one P. P. M. and which is sufficient to establish an ammonia content in the liquid of at least about twenty times the stoichiometric quantity relative to the bromine.

6. Procedure for treatment of aqueous liquid to remove contaminating material, comprising supplying to the liquid an N-bromo compound which is a stable solid, to provide an available bromine content therein of at least about 0.3 P. P. M. and supplying ammonia to the liquid in amount equal to at least about five times the stoichiometric quantity relative to the available bromine.

7. Procedure for treatment of aqueous liquid to remove contaminating material, comprising supplying an N-bromo compound to the liquid to establish a content of available bromine of at least about one P. P. M. therein, and enhancing the activity of said available bromine by supplying ammonia to the liquid in amount equal to at least about fifty times the stoichiometric quantity relative to the bromine.

8. Procedure for purifying a large body of water which is adapted to contain contaminating organisms and to receive further contaminating organisms from time to time over a prolonged period, and which is also adapted to have portions of its water removed from time to time and replaced by fresh water, comprising supplying to said body a quantity of available bromine to establish a residual thereof, supplying ammonia to said body in amount equal to at least about ten times the stoichiometric quantity of said residual bromine to render said residual bromine rapidly available for removal of contaminating organisms, supplying successive further amounts of available bromine, substantially as necessary to maintain the residual thereof for removal of further contaminating organisms, and supplying successive further quantities of ammonia to replace losses due to removal and replacement of water, said successive supply steps being cooperatively controlled to maintain the ammonia concentration at least about ten times the stoichiometric quantity of residual bromine throughout the aforesaid period.

9. The procedure of claim 8 in which the available bromine is supplied in the form of an N-bromo compound which is a stable solid, said compound being supplied in amount sufficient to establish and maintain a residual bromine concentration of at least about one P. P. M.

10. The procedure of claim 8 in which the available bromine and the ammonia are supplied in amounts respectively sufficient to establish and maintain a residual bromine concentration of at least about one P. P. M., and an ammonia concentration equal to at least about fifty times the stoichiometric amount relative to said residual bromine.

11. Procedure for treatment of aqueous liquid to remove contaminating material, comprising supplying available bromine to the liquid to establish a residual content of available bromine therein and supplying ammonia to the liquid in amount to establish an ammonia content of at least about fifty times the stoichiometric quanty relative to the bromine.

HENRY C. MARKS.
FREDE B. STRANDSKOV.

REFERENCES CITED

The following references are of record in the file of this patent:

UNITED STATES PATENTS

| Number | Name | Date |
|---|---|---|
| 1,197,640 | Kriegsheisn | Sept. 12, 1916 |
| 1,894,969 | Wood | Jan. 24, 1933 |
| 1,995,639 | Henderson | Mar. 26, 1935 |
| 2,443,429 | Marks | June 15, 1948 |

FOREIGN PATENTS

| Number | Country | Date |
|---|---|---|
| 5,793 | Great Britain | of 1897 |
| 493,069 | Great Britain | Sept. 26, 1938 |